3,041,383
PROCESS FOR PRODUCTION OF
2,2,2-TRI-NITROETHANOL
Paul F. Hartman, Clifton, N.J., assignor to United States
Rubber Company, New York, N.Y., a corporation of
New Jersey
No Drawing. Filed May 11, 1951, Ser. No. 225,923
11 Claims. (Cl. 260—638)

This invention relates to a new process of making 2,2,2-trinitroethanol, hereinafter tertiary trinitroethanol, from trinitromethane and formaldehyde in an organic solvent from which the said product crystallizes in a substantially pure state and in high yield.

The trinitroethanol is useful both directly as an explosive and propellant and as an intermediate in making other explosives and propellants. For many of these uses it is desirable or necessary that the trinitroethanol be in a substantially anhydrous state. Heretofore, it has been made from the said reagents only in an aqueous solution. The product is hygroscopic and very soluble in water, so that isolation and purification of the trinitroethanol is difficult and expensive. Usually it is done by evaporation of the water in vacuo or by extraction of the product from the aqueous solution by an organic solvent which must then be partly evaporated to effect crystallization of the product. Both methods are tedious and often expensive. The residue from the vacuum evaporation process must usually be recrystallized from an organic solvent in any case.

I have now found a much more practical method of making trinitroethanol which does not involve these expensive and time-consuming purification operations. I have discovered that trinitroethanol can be prepared in a highly advantageous manner by bringing together trinitromethane and formaldehyde under substantially anhydrous conditions, in an inert organic liquid which is a solvent for trinitromethane and for trinitroethanol and from which the trinitroethanol product can be directly crystallized in high purity. I have further found that by employing a sufficiently high concentration of trinitromethane in such a liquid it is possible to cause crystallization of the product in a purity so high that additional purification is unnecessary. This is extremely advantageous because it eliminates the complication and expense incident to the aqueous process outlined above.

The reaction is conducted under substantially non-aqueous conditions, i.e., using essentially anhydrous reactants and under such conditions that no substantial access of water to the reaction mixture occurs during the reaction.

The equation for the reaction is:

$$HC(NO_2)_3 + CH_2O \rightarrow (NO_2)_3C-CH_2OH$$

In a typical embodiment of my invention, a mixture of a solution of trinitromethane in an inert, non-polar, non-oxygenated, water-immiscible organic liquid and paraformaldehyde, the latter preferably being employed in such amount as to furnish a sufficient amount of formaldehyde to react with all of the trinitromethane, is heated at a temperature of from, for example, 40° to 115° C. for a sufficient time to complete the reaction, whereupon the mixture is cooled to room temperature, causing the product to crystallize so that it can be separated in any desired manner.

Hereinafter I use the term "non-polar liquid" as being a liquid having an orientation of permanent dipoles, designated as $P_0$, of less than 5 at 20° C. (The term $P_0$ is used as defined by Hildebrand, "Solubility of Non-electrolytes," Reinhold Publishing Co., New York, second edition, 1936, page 78. The magnitude of $P_0$ for various materials is shown on page 79.)

The term "inert liquid" of course refers only to the non-reactivity of the said liquid in the process of my invention.

The solvent used is generally selected from the group consisting of inert satuarted aliphatic and cycloaliphatic hydrocarbons, mixtures containing a considerable proportion of such hydrocarbons, monocyclic aromatic hydrocarbons such as benzene and toluene, and carbon tetrachloride.

The preferred solvent should have the following properties:

(1) Miscibility with trinitromethane at the reaction temperature,
(2) Chemical inertness in the process,
(3) A boiling point, at atmospheric pressure, which is sufficiently high to effect the desired reaction, and
(4) The ability to effect crystallization of the product in high yield and good purity when the solution temperature is reduced from the usual reaction temperature to room temperature without necessity for concentrating or refrigerating the solution. In other words, the liquid should be an extremely good solvent for the product at the reaction temperature and an extremely poor solvent therefore at room temperature.

In a less preferred form of my invention I carry out the reaction at room temperature. Naturally, the reaction is less rapid than it is at an elevated temperature, and the trinitroethanol remains in solution in certain of my less preferred solvents until I remove part of the solvent, e.g., by evaporation, and/or chill the solution below room temperature.

My preferred solvents are chosen from among the said aliphatic and cycloaliphatic hydrocarbons. These hydrocarbons are commercially available as petroleum distillate fractions which are more volatile than most gasolines. Such fractions are usually mixtures of straight chain, branched chain and cyclic hydrocarbons. I have found that fractions boiling between about 40° and 115° C., and containing a considerable amount of straight chain saturated hydrocarbons, e.g., n-hexane and n-heptane, are particularly useful in my new process. By "considerable" I mean more than about half of the total volume of solvent. Purified n-hexane, n-heptane, cyclohexane, and methylcyclohexane may be used equally well, but they are usually more expensive than the said petroleum fractions.

Typical petroleum fractions which may be used in the preferred process of my invention are Skellysolve B, a fraction boiling at about 60–71° C. and containing a high proportion of n-hexane; Skellysolve C, a fraction boiling at about 86–100° C. and containing a high proportion of n-heptane; Skellysolve F, a petroleum ether boiling at about 30–60° C.; Skellysolve G, a petroleum ether boiling at about 40–75°; and Skellysolve H, a light naphtha boiling at about 60–100° C. These Skellysolve fractions are shown for illustration only. Other petroleum fractions which boil largely between 40° and 115° C. and which contain a considerable proportion of straight chain saturated hydrocarbons are applicable in my invention.

Solvents boiling below about 40° C. are not convenient to use because they are too volatile. Solvents boiling above about 115° C., e.g., a petroleum fraction containing a high proportion of n-octane, should be used only at temperatures below about 115° C., i.e., below their boiling points at atmospheric pressure. Above about 115° C. trinitromethane and trinitroethanol begin to decompose. Therefore, I prefer for convenience to use solvents boiling below about 115° C.

I have also found that branched chain saturated aliphatic hydrocarbons are attacked by trinitromethane and/or the trinitroethanol, especially at temperatures above 100° C., with the formation of nitrogen oxides and other undesirable materials. However, alkyl substituted cycloaliphatic hydrocarbons, e.g., methylcyclohexane, are operable and included in my invention. The Skellysolve petroleum fractions described above contain a sufficiently small amount of branched chain hydrocarbons so that this undesirable reaction is not a problem at or below the atmospheric pressure boiling points of the respective fractions. On the other hand, when Skellysolve E, a mixture of octanes boiling at about 100–140° C., is used at 110° C. instead of one of my suitable solvents under the conditions of my invention the solvent is vigorously attacked and no trinitroethanol is isolated.

That this undesirable result is not due merely to the temperature is evident from the fact that toluene can be used at 110° C. in the operation of my invention. However, I have found that toluene and benzene are less preferred solvents than the aliphatic hydrocarbons discussed above because the trinitroethanol is more soluble at room temperature in the said aromatic hydrocarbons than in the aliphatic ones. With toluene, for example, it is often necessary to cool the reaction mixture below room temperature and/or to add a second liquid, e.g., Skellysolve B, in which the trinitroethanol is much less soluble than in toluene, to the cooled solution in order to effect crystallization of the product. The use of benzene also involves a health hazard to personnel because of the toxicity of its fumes.

Carbon tetrachloride is my least preferred solvent because it suffers from the same solubility and toxicity characteristics as benzene, and because it is normally much more expensive on a volume basis than my preferred aliphatic hydrocarbon fractions.

In the operation of my process I preferably mix the trinitromethane with a sufficient amount of the organic solvent to form a homogeneous solution. I then introduce the formaldehyde and preferably heat the mixture, usually at its boiling point at atmospheric pressure, under reflux for a sufficient time to effect substantially complete reaction. When the mixture is cooled to room temperature the trinitroethanol crystallizes in high purity and yield when one of my preferred solvents is used and when the concentration of trinitromethane therein is sufficiently great. It is conveniently separated from the solution by filtration. It requires no further purification.

The formaldehyde is usually introduced into the reaction mixture in the form of a solid polymer, e.g., paraformaldehyde, which decomposes to monomeric gaseous formaldehyde in the presence of heat or acidic materials. Trinitromethane itself and trinitroethanol are sufficiently strong acids to effect the depolymerization. The reaction conditions employed are such as to effect such conversion of the paraformaldehyde to monomeric formaldehyde in situ. Instead of using a solid polymer, I may introduce the formaldehyde into the reaction at the reaction temperature in the form of the gaseous monomer either continuously or intermittently throughout the reaction period.

The formaldehyde is usually, but not necessarily, introduced into the reaction mixture in slight excess in order to compensate for that which escapes into the atmosphere without reacting with the trinitromethane. A little of the formaldehyde also is lost by conversion into a waxy insoluble polymeric material. However, a large excess, i.e., of the order of 100%, is not necessary, especially when the formaldehyde is generated in situ from paraformaldehyde. Usually I employ a molar ratio of formaldehyde:trinitromethane between 1.0:1 and 1.5:1.

As neither monomeric nor polymeric formaldehyde is very soluble in the solvents used in my process it is desirable to effect as good and as long contact as possible between the gaseous formaldehyde and the solution in order to obtain a high yield of trinitroethanol without undue waste of formaldehyde. I conveniently accomplish this by rapidly agitating the solution during the reaction and by using a tall, slender reaction vessel so that the gas will have to travel a long path from the bottom of the reactor where it is injected as such, or from the zone where it is formed from the paraformaldehyde, before escaping from the top of the reactor. The agitation may be that caused merely by the boiling of the solution and the passage of the gaseous formaldehyde through the solution, or additional agitation; e.g., mechanical stirring, may be employed, as is obvious to any skilled organic chemist. Alternately, I may carry out the reaction in a uniformly heated closed vessel so that the formaldehyde cannot escape to the atmosphere.

The amount of trinitromethane incorporated with the solvent at the beginning of the reaction should be less than that which would result in the formation of a separate trinitromethane-rich liquid phase and less than that which would cause a separate liquid trinitroethanol-rich phase to form at any time during the reaction. In other words the solution should remain homogeneous with respect to trinitromethane and liquid trinitroethanol throughout the reaction. (Of course the paraformaldehyde and sometimes the trinitroethanol form separate solid phases.) The reasons for so limiting the concentration of trinitromethane are: (1) the separation of liquid trinitromethane or liquid trinitroethanol at elevated temperature presents an explosion hazard whereas if these materials are kept in relatively dilute solution in the organic liquid they are safe to handle at such elevated temperatures, and (2) when the trinitroethanol separates from solution as a liquid phase and is subsequently solidified by cooling it is far less pure than when it crystallizes directly from the solution, as is apparent to any skilled organic chemist.

It will be evident that the concentration of trinitromethane in the solvent should be sufficiently great to give a good yield of product upon cooling the reaction mixture to room temperature only. At very low concentrations the process obviously is not as efficient.

I have obtained excellent results using amounts of trinitromethane in the solvent ranging from 2 to 15% by weight of the said solvent. It is obvious that the concentration will vary with the solvent and the reaction temperature. Solvent, temperature and concentration of trinitromethane are correlated to give a homogeneous solution throughout the reaction, as indicated above. With carbon tetrachloride it is necessary to use a concentration of trinitromethane in the upper portion of the above range in order to obtain the product in good yield by merely cooling to room temperature.

The time of reaction is not critical, but it will of course vary with the size of the batch, the temperature of the reaction, the organic solvent, the rate of agitation, etc., as will be apparent to anyone skilled in the art of making organic chemicals. Usually, a time of 2 to 10 hours is sufficient. The reaction is considered to be complete when the paraformaldehyde is completely decomposed, which point can be determined visually.

The following examples illustrate but in no way limit the scope of my invention.

*Example 1*

Mixtures of trinitromethane, paraformaldehyde and a solvent for the trinitromethane were boiled under reflux in an Erlenmeyer flask for one hour, except as noted. The paraformaldehyde had disappeared in this time. The hot liquid was then transferred to another flask in order to separate it from a small amount of waxy polymer which stuck to the glass. The decanted liquid was allowed to cool to room temperature, causing crystallization of 2,2,2-trinitroethanol. It was filtered and dried quickly in vacuo. It melted at 70–72° C. The results with three solvents are shown, as follows:

| Solvent | Amount of Material | | | Yield, percent |
|---|---|---|---|---|
|  | Solvent, ml. | HC(NO₂)₃, g. | (CH₂O)ₓ, g. |  |
| A. Skellysolve B [a] | 200 | 7.8 | 1.65 | 58 |
| B. Carbon tetrachloride | 15 | 2.1 | 0.45 | 52 |
| C. Toluene [b] | 100 | 4.2 | 0.9 | 40 |

[a] Reaction time two hours.
[b] Product crystallized only on adding Skellysolve B and chilling with Dry Ice.

Example 2

A glass tube (750 mm. x 19 mm. I.D.), which had been wrapped with Nichrome wire for electrical heating, was set up vertically under a reflux condenser. Into this tube were charged 1.5 g. paraformaldehyde, 4.95 g. trinitromethane and 150 ml. Skellysolve B. The mixture was boiled until the paraformaldehyde had disappeared, i.e., within three hours. The bubbles of gaseous formaldehyde practically disappeared before reaching the top of the solution. The solution was decanted, cooled and filtered as shown in Example 1. The yield of trinitroethanol was 78% of theory, thus showing the beneficial effect of the long path traversed by the gaseous formaldehyde.

Example 3

A mixture of 2.4 g. trinitromethane, 0.5 g. paraformaldehyde and 50 ml. Skellysolve B was heated at 70–75° C. for 4½ hours in a sealed tube, and then cooled. The product was filtered and dried as in Exmple 1. The yield of trinitroethanol was 76% of theory, thus showing the beneficial effect of pressure.

Example 4

A mixture of 4.8 g. trinitromethane, 1.0 g. paraformaldehyde and 100 ml. carbon tetrachloride was boiled with mechanical stirring under reflux for 4¾ hours. The solution was evaporated to dryness in vacuo. The residue was recrystallized from Skellysolve B, giving a 69% yield of trinitroethanol. Comparison of this example with Example 1B shows that stirring, a longer time of reaction and evaporation of the solvent jointly improve the yield.

Example 5

A mixture of 3.4 g. of trinitromethane, 0.75 g. of paraformaldehyde and 100 ml. of 30–60° C. petroleum ether was boiled under reflux for 2 hours, the temperature of the boiling solution being 41° C., and then cooled. The product was filtered and dried as shown in Example 1, giving a 45% yield of trinitroethanol.

Example 6

A mixture of 2.4 g. of trinitromethane, 0.5 g. of paraformaldehyde and 75 ml. of cyclohexane was boiled (boiling point of solution was 80° C.), cooled, filtered and dried as shown in Example 5, giving a 62% yield of trinitroethanol.

Example 7

A mixture of 1.4 g. of trinitromethane, 0.35 g. of paraformaldehyde and 50 ml. of methylcyclohexane (boiling point of solution was 100° C.) was treated as shown in Example 5, giving a 59% yield of trinitroethanol.

Example 8

A mixture of 2.0 g. of trinitromethane, 0.45 g. of paraformaldehyde and 50 ml. of Skellysolve B was kept in a closed flask at room temperature with occasional shaking. Within one day most of the paraformaldehyde had disappeared, and needles of trinitroethanol had begun crystallizing. After a total time of 65 hours at room temperature, which varied between about 15° and 30° C., the solution was heated momentarily to the boiling point to dissolve the trinitroethanol, thus making sure that no unreacted paraformaldehyde remained, and then cooled, filtered and dried as shown in Example 1. The yield of trinitroethanol was 56% of theory, showing by comparison with Example 1A that the reaction temperature is not critical.

Example 9

This example was carried out like Example 8 except that the solvent was carbon tetrachloride (50 ml.). Within one day the solution had become essentially clear, but it was left for a total of 65 hours at room temperature. The clear solution was then diluted with two volumes of Skellysolve B and chilled in a Dry Ice bath, causing the trinitroethanol to crystallize. It was filtered and dried in vacuo, giving a 42% yield.

I claim:

1. The process of making 2,2,2-trinitroethanol which comprises commingling a solution of trinitromethane in an inert non-polar non-oxygenated water-immiscible organic liquid selected from the group consisting of predominantly straight chain saturated aliphatic hydrocarbons, cycloaliphatic hydrocarbons, monocyclic aromatic hydrocarbons and carbon tetrachloride with formaldehyde under substantially anhydrous conditions, said trinitromethane and formaldehyde being the sole reactive ingredients present.

2. The process of making 2,2,2-trinitroethanol which comprises commingling a solution of trinitromethane in an inert non-polar non-oxygenated water-immiscible organic liquid selected from the group consisting of predominantly straight chain saturated aliphatic hydrocarbons, cycloaliphatic hydrocarbons, monocyclic aromatic hydrocarbons and carbon tetrachloride with formaldehyde under substantially anhydrous conditions, said trinitromethane and formaldehyde being the sole reactive ingredients present, at a reaction temperature of from 15° to 115° C.

3. The process of making 2,2,2-trinitroethanol which comprises heating at the boiling point at atmospheric pressure and under reflux a solution of trinitromethane in an inert non-polar non-oxygenated water-immiscible organic liquid selected from the group consisting of predominantly straight chain saturated aliphatic hydrocarbons, cycloaliphatic hydrocarbons, monocyclic aromatic hydrocarbons and carbon tetrachloride in the presence of formaldehyde under substantially anhydrous conditions, said trinitromethane and formaldehyde being the sole reactive ingredients present, the boiling point of said mixture ranging from 40° to 115° C. at atmospheric pressure.

4. The process of making 2,2,2-trinitroethanol which comprises heating at the boiling point at atmospheric pressure and under reflux a solution of trinitromethane in an inert non-polar non-oxygenated water-immiscible organic liquid selected from the group consisting of predominantly straight chain saturated aliphatic hydrocarbons, cycloaliphatic hydrocarbons, monocyclic aromatic hydrocarbons and carbon tetrachloride in the presence of formaldehyde under substantially anhydrous conditions, said trinitromethane and formaldehyde being the sole reactive ingredients present, the boiling point of said mixture ranging from 40° to 115° C., cooling the resulting reaction mixture when the reaction is substantially complete to room temperature and thereby effecting crystallization of the 2,2,2-trinitroethanol in high purity, and separating said crystallized 2,2,2-trinitroethanol.

5. The process of making 2,2,2-trinitroethanol which comprises heating at the boiling point at atmospheric pressure and under reflux a solution of trinitromethane in an inert non-polar non-oxygenated water-immiscible organic liquid selected from the group consisting of predominantly straight chain saturated aliphatic hydrocarbons, cycloaliphatic hydrocarbons, monocyclic aromatic hydrocarbons and carbon tetrachloride in the presence of paraformaldehyde under substantially anhydrous conditions, said trinitromethane and paraformaldehyde being the sole reactive ingredients present, the boiling point of said mixture ranging from 40° to 115° C. at atmospheric pressure.

6. A process as set forth in claim 3 wherein the amount of trinitromethane in said liquid ranges from 2 to 15% by weight of said liquid.

7. A process as set forth in claim 2 wherein said liquid is a paraffin hydrocarbon mixture containing more than 50% by volume of normal hexane and having a boiling range of approximately 60° to 71° C.

8. A process as set forth in claim 2 wherein said liquid is petroleum ether.

9. A process as set forth in claim 2 wherein said liquid is carbon tetrachloride.

10. A process as set forth in claim 2 wherein said liquid is toluene.

11. A process as set forth in claim 2 wherein said liquid is cyclohexane.

References Cited in the file of this patent

UNITED STATES PATENTS

| | | |
|---|---|---|
| 2,135,444 | Vanderbilt | Nov. 1, 1938 |
| 2,139,120 | Hass et al. | Dec. 6, 1938 |
| 2,475,996 | Smith | July 12, 1949 |

OTHER REFERENCES

Copenhaver et al.: "Acetylene and Carbon Monoxide Chemistry," Reinhold Publishing Co., N.Y. (1940), pages 24–25.